Dec. 29, 1931.  W. D. BOST  1,838,210

SHREDDING DEVICE

Filed May 10, 1929

Inventor:
William D. Bost
By Cleo P. Hough
Atty.

Patented Dec. 29, 1931

1,838,210

UNITED STATES PATENT OFFICE

WILLIAM D. BOST, OF CHICAGO, ILLINOIS, ASSIGNOR TO ORANGE-CRUSH COMPANY, OF CHICAGO, ILLINOIS, A CORPORATION OF ILLINOIS

SHREDDING DEVICE

Application filed May 10, 1929. Serial No. 362,023.

The present invention relates to a mechanical grater or shredder, and has to do particularly with a novel mechanism whereby the skins or peels, or portions of the skin or peel, of fruit (and particularly citrus fruits) may be quickly removed without danger of damaging the remainder of the fruit or penetration of the pulpous matter thereof.

For certain canning and preserving operations, as well as for the extraction of juice from citrus and other fruits, it is desirable to remove the stem and blossom ends of the fruit. In the orange, and particularly the navel orange, there is an accumulation of foreign matter within the folds of the skin which matter, if permitted to remain during the cooking, preserving or juice-extracting operations, will cause a streaking of or discoloration of the resulting product. Heretofore, these ends have generally been removed by knives, which is not only a tedious and slow process, but the knives frequently open or penetrate the pulpous structure adjacent the ends mentioned.

The objects of the present invention, therefore, include a new and novel means for quickly removing the greater thickness of or all of the peel at the end of or upon other parts of fruit, the removal being accomplished without the loss or destruction of pulpous matter and generally without penetration entirely through the skin to such pulpous matter, and a new and novel feeding means for determining the extent to which fruit may be inserted into the apparatus; also a new and novel rotary grating instrumentality.

Figure 1:
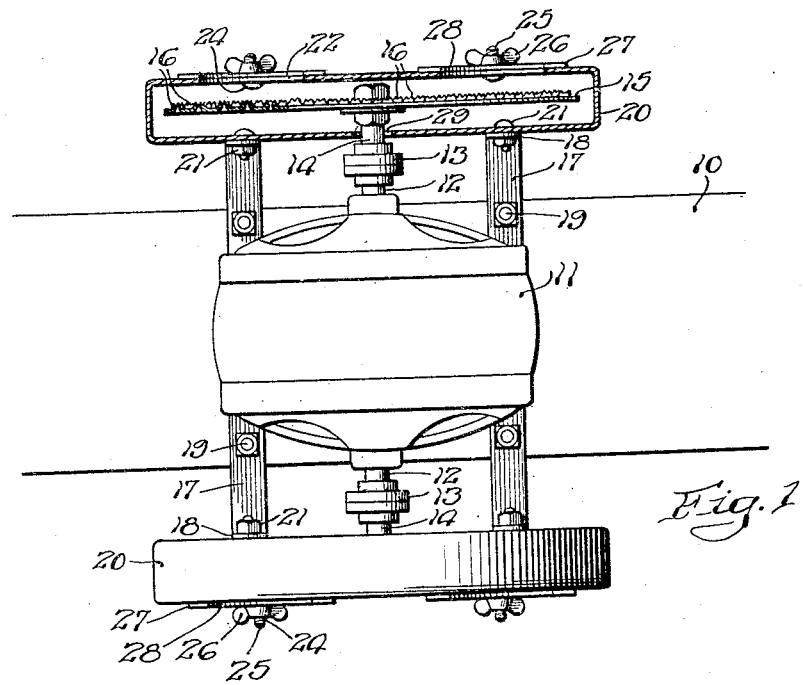
Figure 2:
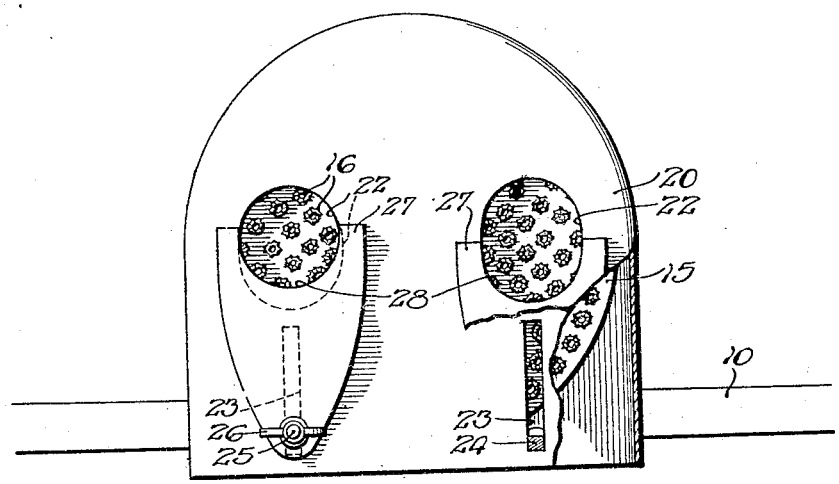

These objects, and such other objects as may hereinafter appear, are attained by the novel construction, unique combination, and improved arrangement of the several elements which constitute the one form of the invention illustrated in the accompanying drawings, and in which:

Figure 1 is a plan view of an apparatus embodying the invention, one end of the apparatus being shown in longitudinal section to illustrate the internal arrangement thereof; and Figure 2 is an elevation, with the housing partly broken away at one corner and with one guiding means removed, the guiding means mentioned limiting the extent of entry of fruit into the device.

Like reference characters are used to designate similar parts in the drawings and in the description of the invention hereinafter given.

The two figures may be read conjointly. Upon any suitable base 10, a prime mover 11 is mounted. In the present instance, it is an electric motor. From the ends of the said motor, its shaft 12 projects. Suitable coupling means 13 are provided whereby to secure to the shaft 12 a stub shaft 14. This carries with it a holder member which comprises two or more parts adapted to be separated to receive therebetween a disc 15. Ordinarily such disc is readily removable for replacement.

The disc 15 is of suitable metal. There has been driven through the flat surface thereof from one side a number of deforming dies which have caused the material of the disc 15, through which the dies have passed, a plurality of perforations 16. The irregular edges of all of the perforations 16 project toward the outside of the device, the jagged edges thus produced providing cutting or grating edges.

The character of die employed upon disc 15 will determine the size of the perforations 16 and the roughened edges therearound, hence these should be selected for size and character for each particular fruit upon which the discs 15 are intended to operate.

The discs 15 may be at each end of the device. About the discs 15 are housings. Such housings are seated or secured upon bars 17 which are turned up at their ends to provide a vertical section 18, the bars 17 being secured to the base 10 by bolts and nuts 19.

Upon each of the upright sections 18, there generally being two bars 17, is a housing 20 which is semi-cylindrical at its top and open at its bottom. Bolts and nuts 21 extend through the upright portions 18 and the housing 20 for the purpose of securing said housing in its proper position.

In the front of each of the housings 20 are two windows 22. There may be only one such window or more than two thereof.

Beneath the windows 22 are slots 23 which are vertical in their arrangement in the present instance. These are in diametric alignment with respect to the windows 22. In each of the slots 23 is a bolt 24 preferably having a short square shank and a threaded portion 25.

Upon the threaded portion 25 of bolt 24 is a wing nut 26. A shield 27, having a peripheral semi-circular opening 28 in the top end thereof is adapted to be held upon the side of the housing 20 by the bolt 24, the square shank of which preferably extends into a square opening in the shield 27 from the slot 23.

When the nut 26 is loose upon the bolt 24, it is possible to adjust the shield 27 up and down upon the housing 20 so that the upper half of the window 22 cooperating with the U-shaped peripheral opening 28 of the shield 27 may be adjusted relatively one to another to generally determine the size of the opening through which fruit may be inserted to cause it to come into contact with the rotary grater 15 within the housing 20.

When the desired adjustment is obtained, the wing nut 26 is tightened upon the bolt 24, and the bolt and nut hold the shield 27 in such adjusted position.

Fruit is then adapted to be inserted through the opening between the edge of the window 22 in the housing 20 and the edge of the peripheral opening 28 in the shield 27. Ordinarily fruit is packed in boxes, and when so packed, each box contains fruit of a definite or graded size, so that nearly all of the fruit of a selected grade is substantially the same diameter. Therefore, an operator of the machine may quickly adjust the shield 27 to provide an opening of suitable size for the selected fruit, so that when such fruit, one at a time, is inserted into the opening just described, it may penetrate toward the disc 15 a limited distance, i. e., just the distance normally required to remove the stem end and the blossom end of the peel without penetrating to the pulp. With different sizes of fruit, the shield 27 is readjusted.

A suitable slot or opening 29 is provided in said housing 20 to prevent the said housing from filling about the shaft 12 between the coupling 13 and disc 15.

The novelties of the invention include the provision of a rotary grater, associating with such a grater a housing whereby the material removed will be discharged downwardly into a receptacle, not shown, but placed beneath the open bottom of housing 20, providing the housing with adjustable means to determine the extent to which fruit may be inserted thereinto, making the housing entirely independent of the grater, providing in a single motor an operable grater at each side thereof, and providing upon each side of a motor a plurality of openings so that numerous operators may clean fruit with the aid of a single prime mover. Other novelties reside in the arrangement of the housing about the motor and disc and the support for the housing surrounding the rotating grater.

In operation, the motor 11 is driven at its normal speed. Operatives adjust the openings in the housings to the proper size. Fruit, manually directed, is held in the openings until the disc 15 removes the proper amount of peel, which is readily determined by the grater no longer engaging the fruit. The fruit is then passed to the next operation and new fruit brought into contact with disc 15.

I claim:

1. A grating device comprising a base, a motor mounted thereon and having a shaft, disc graters on said shaft at the opposite sides of said motor and beyond the edge of said base, parallel supports transversely arranged upon said base, housings secured to said supports and extending over said graters and open at their bottoms, and windows in said housing admitting objects to the action of said graters.

2. In combination, a motor having a two ended shaft, a grater on each end of said shaft, supports arranged parallel to said shaft, housings having parallel walls extending about said graters, one of said walls being secured to the ends of said supports, the other of said walls having an object receiving opening, there being a slot in said last mentioned wall adjacent to said object receiving opening, and a sliding shield mounted in said slot and adapted to be moved over said opening.

WILLIAM D. BOST.